United States Patent [19]
Bruckert

[11] 3,760,355
[45] Sept. 18, 1973

[54] DIGITAL PATTERN DETECTOR

[75] Inventor: Eugene J. Bruckert, Plantation, Fla.
[73] Assignee: Motorola, Inc., Franklin Park, Ill.

[22] Filed: Mar. 8, 1972
[21] Appl. No.: 232,884

[52] U.S. Cl.... 340/146.2, 235/181, 340/146.3 WD, 340/149 R
[51] Int. Cl. .......... G06f 7/02
[58] Field of Search .......... 235/181, 183, 177; 340/146.2, 149 R, 146.3 R, 146.3 E, 146.3 K, 146.3 Q, 146.3 Y, 146.3 Z, 146.3 AC, 146.3 WD; 178/69.5 R

[56] References Cited

UNITED STATES PATENTS

| | | | |
|---|---|---|---|
| 3,651,459 | 3/1972 | Hahn | 340/146.3 WD |
| 3,274,379 | 9/1966 | Hinrichs | 235/177 |
| 3,601,801 | 8/1971 | Sauvan | 340/146.2 |
| 3,654,390 | 4/1972 | Puckette | 178/69.5 R |
| 3,656,109 | 4/1972 | Conway | 340/146.2 |
| 3,670,151 | 6/1972 | Lindsay et al. | 235/177 |

OTHER PUBLICATIONS

Stein et al.: Digital Matched Filters Electronic Engineering, Vol. 40, No. 484, June 68, p. 341-342.

*Primary Examiner*—Felix D. Gruber
*Attorney*—Vincent J. Rauner et al.

[57] ABSTRACT

A detector for detecting a predetermined digital pattern having a predetermined number of bits employing a shift register having one stage more than the number of bits making up the predetermined digital pattern to serially receive the pattern. The first, last and selected intermediate stages of the shift register are sampled and compared with the contents of a second register having a predetermined pattern stored therein. The transitions of the pattern to be detected determine the stages of the shift register that are to be selected for sampling and the pattern to be stored in the second register. Comparison circuitry that provides a "+1," "0" or "−1" each time a bit from the shift register is compared to a bit stored in the second register is employed. An up-down counter is used to sum the signals from the comparison circuitry. The count in the counter is indicative of the received pattern, and reaches a predetermined value only upon receipt of the predetermined pattern.

17 Claims, 6 Drawing Figures

| PATTERN | 0 | 1 | 0 | 0 | 1 | 1 | 1 | 1 | COMPARISON | INPUT TO ACCUMULATOR | NUMBER IN COUNTER | |
|---|---|---|---|---|---|---|---|---|---|---|---|---|
| STAGE NUMBER / TIME | 1st | 2nd | 3rd | 4th | 5th | 6th | 7th | 8th | I | II | III | |
| $t_1$ | 1 | | | | | | | | 0 | 0 | 0 | IF SAME ADD 1 |
| $t_2$ | | 1 | | | | | | | S | +1 | +1 | IF SAME ADD 1 IF OPPOSITE SUBTRACT 1 |
| $t_3$ | | | 1 | | | | | | 0 | –1 | 0 | |
| $t_4$ | | | | 1 | | | | | 0 | 0 | 0 | |
| $t_5$ | | | | | 1 | | | | S | +1 | +1 | |
| $t_6$ | | | | | | 1 | | | S | 0 | +1 | |
| $t_7$ | | | | | | | 1 | | S | 0 | +1 | |
| $t_8$ | | | | | | | | 1 | S | –1 | 0 | IF SAME SUBTRACT 1 |

Fig. 3

STAGE OF SHIFT REGISTER 20

| TIME | 1st | 2nd | 3rd | 4th | 5th | 6th | 7th | 8th | NUMBER ADDED TO COUNTER I | NUMBER ACCUMULATED IN COUNTER II |
|---|---|---|---|---|---|---|---|---|---|---|
| $t_0$ | 0 | 0 | 0 | 0 | 0 | 0 | 0 | 0 | 0 | 3 |
| $t_1$ | 1 | 0 | 0 | 0 | 0 | 0 | 0 | 0 | –1 | 2 |
| $t_2$ | 1 | 1 | 0 | 0 | 0 | 0 | 0 | 0 | +1 | 3 |
| $t_3$ | 1 | 1 | 1 | 0 | 0 | 0 | 0 | 0 | –1 | 2 |
| $t_4$ | 0 | 1 | 1 | 1 | 0 | 0 | 0 | 0 | 0 | 2 |
| $t_5$ | 0 | 0 | 1 | 1 | 1 | 0 | 0 | 0 | 0 | 2 |
| $t_6$ | 1 | 0 | 0 | 1 | 1 | 1 | 0 | 0 | +1 | 3 |
| $t_7$ | 0 | 1 | 0 | 0 | 1 | 1 | 1 | 0 | +4 | 7 |
| $t_8$ | 0 | 0 | 1 | 0 | 0 | 1 | 1 | 1 | –3 | 4 |
| NUMBER IN MEMORY 30 | 0 | 1 | 0 | | 1 | | | 1 | | |

IF SAME ADD 1 (1st) — IF SAME ADD 1 IF DIFFERENT SUBTRACT 1 (2nd–5th) — IF SAME SUBTRACT 1 (8th)

Fig. 5

DIGITAL PATTERN DETECTOR

BACKGROUND

This invention relates generally to digital systems, and more particularly to digital pattern recognition systems which recognize the presence of a predetermined digital pattern or sequence of bits.

There are many applications wherein it is necessary to recognize a predetermined binary or other digital sequence of signals. Systems requiring recognition of a predetermined digital pattern include selective calling communications systems and synchronized data transfer systems that require bit and frame synchronization. Several pattern recognition techniques are known. One such system samples the contents of a shift register containing a received digital sequence after the receipt of each bit, and counts the number of stages in the shift register that have bits corresponding to a predetermined pattern stored in a memory circuit. Another such system compares the contents of each stage of the shift register with an associated bit stored in the memory circuit to determine if the pattern being received exactly corresponds with the stored pattern.

Whereas these techniques provide ways to achieve recognition of a predetermined digital pattern, the first system requires that each stage of the shift register be compared with an associated stage of a memory circuit, and that the corresponding bits be counted each time a new bit is received. The second technique is prone to interference from noise and other sources, because a single noise burst causing an error in one bit can prevent recognition of the pattern.

SUMMARY

It is an object of the present invention to provide an improved pattern recognition system that eliminates the need for monitoring and recounting the contents of an entire shift register every time a new bit is received.

It is another object of this invention to provide a simplified pattern recognition system that eliminates the need for monitoring the contents of every stage of a shift register through which the pattern may pass.

It is a further object of this invention to provide a simplified pattern recognition system that is relatively unaffected by errors resulting from channel noise and other interference.

In accordance with the invention, a shift register having one stage more than the number of bits comprising the word or pattern to be recognized is employed. The first, last and intermediate stages of the shift register that correspond to bits that immediately precede a transition in the pattern are tapped and compared with a word or pattern stored in a memory circuit. A "+1" is generated by the comparison circuitry if the first stage of the shift register contains a bit that corresponds to an associated bit stored in the memory. A "0" is generated if there is no correspondence. Similarly, a "+1" is generated for each intermediate stage containing a bit that corresponds to an associated bit stored in the memory circuit, but a "−1" is generated if there is no correspondence. In the last stage comparison, a "−1" is generated if the bit in the last stage corresponds to an associated bit stored in the memory, and a "0" is generated if there is no correspondence. The "+1's", "−1's" and "0's" resulting from each comparison are summed in a counter circuit. The contents of the counter correspond to the degree of correlation between the desired bit pattern and the bit pattern being received. When the count in the counter reaches a predetermined value, which is a function of the particular code used, a signal indicating that the correct pattern has been received is generated.

DESCRIPTION OF THE DRAWINGS

In the drawings:

FIG. 3 is a table showing the result obtained when a 1-bit sequence is passed through the system of FIG. 1 and compared with the pattern of FIG. 2;

FIG. 5 is a table showing the results obtained when the sequence of FIG. 4 is passed through the system of FIG. 1 according to the invention.

DETAILED DESCRIPTION

Figure 1:
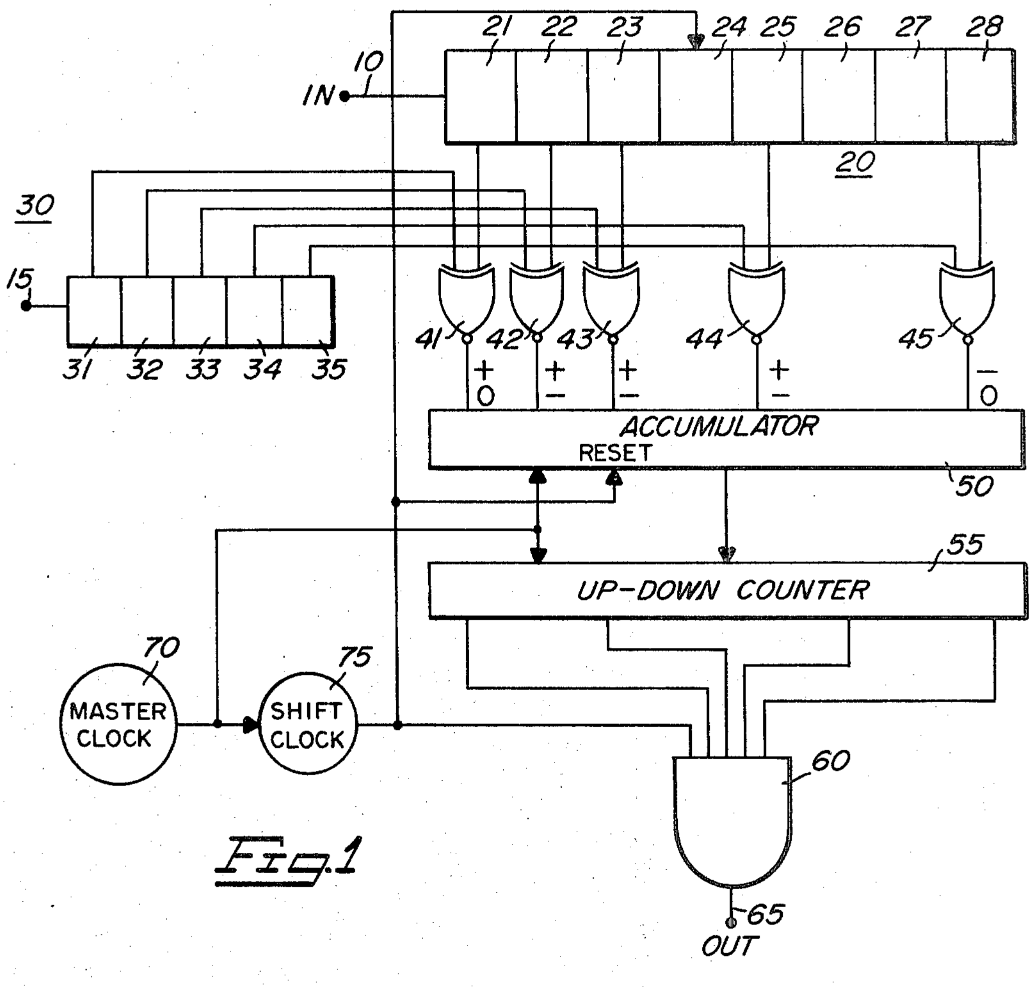
FIG. 1 is a block diagram of one embodiment of a digital pattern recognition system according to the invention.

Referring to FIG. 1, there is shown, in block diagram form, one embodiment of the invention. A digital signal containing binary words is applied to an input point 10 connected to a sample and storage means, which is an eight stage shift register 20 in this embodiment. The shift register 20 includes eight stages 21 through 28 for detecting a 7-bit sequence. The output of the first stage 21 of shift register 20 is connected to one input of a comparison means, in this embodiment gate 41. The outputs of intermediate stages 22, 23 and 25 of shift register 20 are connected to inputs of other comparison means, in this embodiment, gates 42, 43 and 44, respectively. Not all of the intermediate stages 22 through 26 need be sampled. The criterion for selecting the gates to be sampled is determined by the pattern to be recognized, and will be discussed later in this application. The output of the last stage 28 of shift register 20 is connected to a gate 45 or other suitable comparison means. Although gates 41 through 45 can be any suitable comparison circuits, in this embodiment gates 41 through 45 have been chosen to be "exclusive nor" gates, hereinafter referred to as EX NOR gates. "Exclusive or" gates, hereinafter referred to as EX OR gates, may also be used if appropriate changes in the polarity of the logic are made. "Exclusive nor" gates have the property that they provide an output when the signals applied to their inputs are substantially similar, such as, when the inputs are either both "1's" or both "0's". An "exclusive or" gate provides an output when the signals applied to its input are dissimilar such as a "1" and a "0."

The other input of each of gates 41 through 45 is connected to a memory means, register 30 including five stages 31 through 35 in this embodiment. Memory register 30 is used to store a second predetermined pattern which is related to the predetermined pattern, applied to input point 10. The second pattern may be entered into register 30 via a memory input lead 15, or by other means, such as, for example, jumper wires. The method for determining the second predetermined pattern will be discussed later in this application. Although register 30 has a separate stage associated with each of the five gates, it should be noted that any number of stages may be used, with more than one gate being connected to each stage, if desired, and it will still fall within the scope of the invention. For very simple systems, register 30 may include only one stage which may comprise a jumper wire, and gates 41 through 45 can be a combination of EX OR and EX NOR gates chosen to provide outputs either when the inputs to each gate are the same or different, the gates thereby determining the second predetermined pattern rather than the numbers in register 30.

The output of each of the gates 41 through 45 is connected to an accumulator 50. The accumulator 50 adds or subtracts numbers according to the following rules. If the first EX NOR gate 41 provides an output, a "1" is added, if not, nothing is added. If any of the intermediate EX NOR gates 41 through 44 provide an output, a "1" is added, if any do not, a "1" is subtracted. If the last EX NOR gate 45 provides an output, "1" is subtracted, if it does not, nothing is done. Although "1's" are added or subtracted to provide comparison signals, it should be noted that any positive or negative unit of measure can be used to achieve the same result.

The output of accumulator 50 is connected to an up-down counter 55, which counts the output signals from accumulator 50. The up-down counter 55 has the property that its count can be either increased or decreased, and that the value of the count therein cannot exceed the number of bits in the predetermined pattern, nor be less than zero. The outputs of up-down counter 55, which provide signals indicative of the value of the count in counter 55 in binary form in this embodiment, are connected to a gate 60. Gate 60 is a gate which has been programmed to provide an output signal at point 65 when signals applied thereto indicate that the value of the count in up-down counter 55 has reached or exceeded a predetermined value. This value is determined by the particular code used, and may be less than the number of bits in the pattern if the predetermined pattern is sufficiently different from other patterns (as in the case of cyclic codes) to permit identification of the pattern even though not all bits in shift register 20 correlate with the associated bits in memory register 30. Although accumulator 50, up-down counter 55 and gate 60 are used to provide an indication of the accumulated sums and differences of the signals at the outputs of gates 41 through 45, any counting means providing this function, may be used.

The system of FIG. 1 is clocked, being controlled by a master clock 70 connected to accumulator 50 and up-down counter 55. It is also controlled by a shift clock 75 having an input connected to master clock 70 and an output connected to shift register 20, accumulator 50 and gate 60. Shift clock 75 causes shift register 20 to accept a new bit applied to input point 10 and to store it in stage 21. Each bit previously stored in shift register 20 is shifted to a stage immediately to the right of the stage in which it was previously stored upon receipt of a shift clock pulse. In this manner, each bit applied to input point 10 is first stored in stage 21 and sequentially shifted to stages 22 through 28, and discarded after it is shifted from stage 28. Shift clock 75 also resets accumulator 50 to zero during each shift, and enables gate 60 to provide an output pulse if the count in up-down counter 55 has reached or exceeded a predetermined value. Master clock 70 is used to drive shift clock 75 and to enable accumulator 50 to sum the signals from gates 41 through 45 between shifts. Master clock 70 also enables up-down counter 55 to count the contents of accumulator 50.

Figure 2:
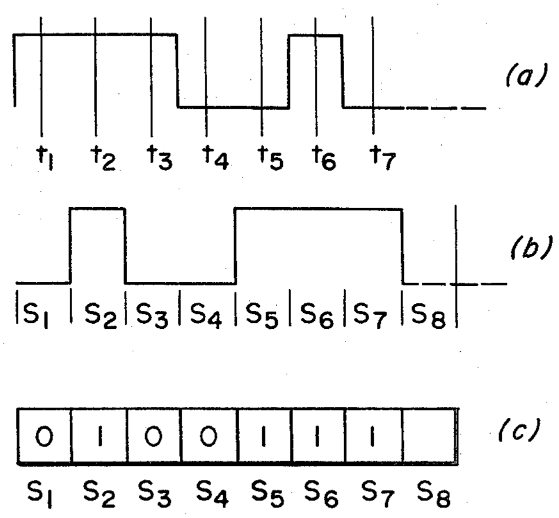
FIG. 2 shows, in graphical and tabular form, a 7-bit sequence forming a predetermined pattern to be detected as it appears as a time sequence, and as it appears when stored in a shift register.

Referring to FIG. 2, there is shown in FIG. 2*a* a graphical representation of a time sequence of pulses which comprises the desired pattern to be recognized. The pattern in this example is a 7-bit sequence which may be represented as (1,1,1,0,0,1,0). Although a particular 7-bit sequence is used as an illustrative example, it should be noted that any sequence having any number of bits can be recognized using the present invention.

FIG. 2*b* shows a graphical representation of the pattern of FIG. 2*a* that has been loaded into the first seven stages of a shift register. In this example, an eight stage shift register comprising stages $S_1$ through $S_8$, which correspond to stages 21 through 28, respectively, of register 20, is used. Note that because each bit of the sequence of FIG. 2*a* is first loaded into the first stage $S_1$ of the shift register, and subsequently shifted to the following stages $S_2$ through $S_8$ upon receipt of the following bits in the sequence, the pattern of FIG. 2*b* is in reverse order from the pattern of FIG. 2*a*. Note also that since only 7 bits are presently being considered, the bit stored in the last stage $S_8$ of the shift register is presently indeterminate. FIG. 2*c* shows a numerical representation of the pattern of FIG. 2*b*.

In order to determine whether a particular pattern is the same as a desired pattern, each bit of the particular pattern is compared with each associated bit of the desired pattern, and the number of bits that correspond are counted. For example, in a 7-bit sequence, if all bits correspond, 7 corresponding bits will be counted. Conversely, if the two patterns are the inverse of each other, no bits will correspond and the count will be zero. If a pattern containing all "0's" is compared with a pattern containing, for example, four "1's" and three "0's", the count will be three. If a pattern containing all "1's" is compared with the pattern containing four "1's" and three "0's", the count will be four. It should be noted that when two patterns are compared, the fewest number of corresponding bits allowable is zero, that is, it is impossible to have a negative number of bits that correspond. Also, it is impossible to have a count greater than the number of bits in the sequence. For example, if two 7-bit sequences are compared, it is impossible to have more than 7 bits corresponding with each other. If the two compared patterns have an unequal number of bits, it is impossible to get a count greater than the number of bits in the shorter pattern. For example, if a 7-bit sequence is compared to a 1-bit sequence, it can be seen that the 1 bit of the 1-bit sequence cannot correspond to more than 1 bit of the 7-bit sequence. The aforementioned considerations are the basis for the rules governing pattern detection systems which are: Firstly, the number in the counter can never become less than zero nor greater than the number of bits in the sequence to be detected; and secondly, each bit in the sequence cannot contribute more than once to the count in the counter.

As was stated previously, only certain ones of the intermediate stages of shift register 20 of FIG. 1 need be sampled, according to the invention. The particular stages that are sampled are determined by the particular pattern to be detected. In order to illustrate how the intermediate taps are chosen, the following example will be given.

A 1-bit sequence consisting of a "1" will, for purposes of illustration, mentally be passed through a system similar to the system of FIG. 1. A 1-bit sequence cannot, practically, be passed through the system because each bit must be either a "1" or a "0," and it is not possible to have a single bit followed by bits that are neither "1's" nor "0's". The following mental example is provided to illustrate the contribution to the count in the counter from 1 bit in a sequence as it is shifted through the shift register. The bits that normally precede and follow the bit considered in this example are ignored for purposes of clarity. The system in this example has an eight stage memory register and eight comparison gates to allow all eight stages of the shift register to be sampled. The 1-bit sequence will be compared with the pattern of FIG. 2*c*, stored in the memory register, according to the previously specified comparison rules, which are recited in the following. If the bit in the first stage of the shift register corresponds to the first bit of the desired sequence stored in a memory register, a "1" is added to the accumulator. If not, nothing is added. If the bits in each of the intermediate stages of the shift register correspond to associated intermediate bits of the desired pattern in the memory register, a "1" is added. If not, a "1" is subtracted. If the bit in the last stage of the shift register corresponds to an associated bit in the memory register, "1" is subtracted. If not, nothing is done. Although "1's" are used as the basic unit of measure in this embodiment, any suitable positive or negative unit of measure may be used to achieve the same result. Since there is one more stage in the shift register and in the memory register than there are bits in the desired pattern, the desired pattern does not directly define the bit to be stored in the last stage of the memory register, and a means for determining this bit must be provided. The method of determining the last comparison bit will be described later in this example.

FIG. 3 shows, in tabular form, the results of a comparison between the 1-bit sequence consisting of a "1" and the desired pattern of FIG. 2*c* when the comparison is made according to the aforementioned rules. The desired pattern and the memory register stage in which each bit of the desired pattern is stored are shown at the top of the chart. The desired pattern determines the contents of the first seven stages directly, and the contents of the last stage indirectly. The 1-bit sequence is shown in the body of the chart as it moves through the shift register and is sequentially compared with each bit of the desired pattern at times $t_1$ through $t_8$. The first column to the right of the eight stages, column I, entitled "Comparison," shows the results of each of the eight sequential comparisons, "O" designating opposite and "S" designating same. The second column, column II, entitled "Input to Accumulator," shows the number that is added to or subtracted from the accumulator as a result of the comparison of Column I according to the aforementioned comparison rules. The third column, column III, entitled "Number in Counter," shows the number in the counter following each shift, and reflects the number shown in the "Input to Accumulator" column.

Referring to FIG. 3, assume that previous to time $t_1$, no signals were passed through the system and that the counts in the accumulator and in the counter were zero. At time $t_1$, the 1-bit sequence consisting of a single "1" is compared with the contents of the first stage of the memory register containing the desired pattern. In this case, the first stage of the memory register contains a "0," which is the opposite of the "1" in our 1-bit sequence. Hence, according to the rule governing first stage comparisons, nothing is added to the accumulator, and the number in the counter remains zero. Because only a 1-bit sequence is used in this comparison, no comparisons need be made with the contents of the second through eighth stages of the memory register. In practical situations, however, where longer sequences would be employed, comparisons of the other stages would be necessary. At time $t_2$, the 1-bit sequence is shifted and compared to the second bit in the stored pattern, in this case a "1." Since the bits correspond, and the rules governing intermediate comparisons apply, a "1" is added to the accumulator, and subsequently transferred to the counter. At time $t_3$, the 1-bit sequence does not correspond to the third bit of the pattern and a "−1" is applied to the accumulator which subsequently reduces the number in the counter to zero. At time $t_4$, the bit still does not correspond to the pattern, but a "1" is not subtracted because the number in the counter cannot be allowed to go negative, so no entry is made to the counter. At time $t_5$, the bit and the fifth stage of the pattern correspond, so a "1" is added to the accumulator and counter. At time $t_6$, the bit and the sixth stage of the pattern again correspond, but since the count in the counter is already equal to the number of bits in the sequence being compared (a 1-bit sequence), and since the bit cannot be allowed to contribute more than once to the count, no entry is made, and the count in the counter remains at one. At time $t_7$, the bit and the seventh stage of the pattern again correspond, but since the number in the counter is still one, no entry is made.

The 1-bit sequence has now been compared to each bit of the desired pattern. The count in the counter at the end of time $t_7$ is one, which indicates that the bit of the 1-bit sequence correlates with one of the bits of the desired 7-bit sequence. At time $t_8$, the 1-bit sequence is no longer being compared with the 7-bit pattern, but the counter has accumulated a "1" as a result of previous comparisons. This accumulated "1" must be removed after the 1-bit sequence has passed through the first seven stages of the register. This is done in the eighth stage. If a "1" is loaded into the eighth stage of the memory register, and the comparison made according to the last stage rule, a "1" is subtracted from the number in the counter, thereby returning the count to zero. It should be noted that a number other than a "1" could have been entered into the eighth stage, and the last stage comparison rule changed accordingly to achieve the same result.

Note that the fourth, sixth and seventh comparisons did not contribute to the value of the number in the counter. It can be demonstrated that if a 1-bit sequence consisting of a "0" rather than a "1" were compared with the same desired pattern, the fourth, sixth and seventh stages would still not contribute to the count. Hence, these stages need not be sampled. The general rule is that only the first and last stages of the shift register, and those shift register stages that store a bit of different polarity than the bit immediately to the left of it when the desired pattern is fully loaded in the shift register, need be sampled. Since the older bits are to the right in the register, the rule for positioning the sampling taps may be stated thusly: of the intermediate stages, only the stages corresponding to bits immediately preceding (in time) transitions, or changes in polarity, of a fully loaded pattern need be sampled.

Figure 4:
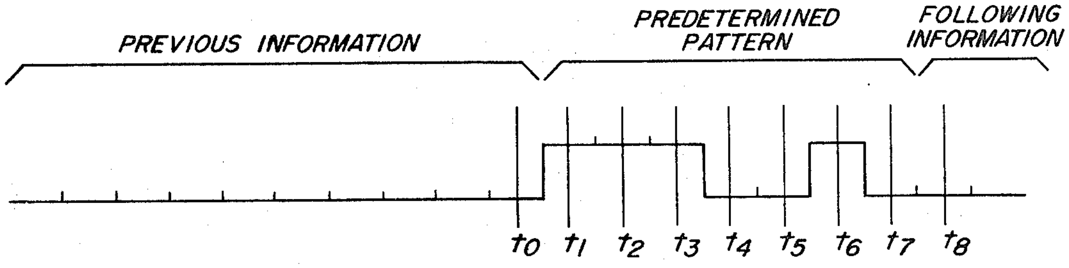
FIG. 4 is a graph of a sequence of pulses which includes the predetermined pattern of FIG. 2, and is an example of the type of signal which may be passed through the system of FIG. 1.

In order to illustrate the operation of the circuit of FIG. 1 when the correct pattern is received, the pattern shown graphically in FIG. 4 will be passed through the system. Referring to FIG. 4, there is shown a sequence of bits containing the desired predetermined pattern. The predetermined pattern is the 7-bit sequence (1,1,1,0,0,1,0) transmitted during the interval from time $t_1$ through time $t_7$. For clarity of illustration, the information previous to time $t_1$ and following time $t_7$ consists of all zeros, however, it should be noted that any pattern may precede and follow the predetermined pattern without affecting the operation of the circuit, and it will still fall within the scope of the invention.

FIG. 5 shows the manner in which detection of the predetermined pattern is accomplished when the sequence shown in FIG. 4 is passed through the system of FIG. 1, according to the invention. Referring to FIG. 5, the contents of the eight stages of the shift register 20 are shown during each of the time intervals $t_0$ through $t_8$ as the sequence of FIG. 4 is passed through the register. The bottom row of the table entitled "Number In Memory 30" shows the number stored in the five stage memory register 30, and indicates with which five stages of the eight stage shift register 20 comparisons are to be made.

The contents of the memory are derived as explained in the foregoing example. The first bits in the memory register 30 are the same as the bits of the desired predetermined pattern that immediately precede (in time) a change in polarity, or transition, in the predetermined pattern. Since the predetermined pattern becomes (0,1,0,0,1,1,1) when serially loaded into the first seven stages of a shift register (the serial loading appears to reverse the time sequence) the second, third and fifth stages (the stages immediately to the right of a polarity change) of the shift register 20 are tapped, and bits equal to the bits stored therein are stored in the memory register. The first stage is always selected, and its bit stored, whether or not it precedes a polarity change. The last bit in the memory register is chosen, as previously explained, to clear the counter of the contribution of each bit as that bit leaves the first seven stages of the shift register.

The comparison rules are shown for each stage below the table. The column to the right of the column denoting the contents of the eighth stage of the shift register, Column I, entitled "Number Added to Counter," shows the number added to the counter as a result of the five comparisons, according to their respective rules, made during each time interval. The last column, Column II, entitled "Number Accumulated in Counter," denotes the number in the counter at the end of each time interval, which results from past and current contributions.

The first row of the table shows the contents of the shift register 20 at a time $t_0$, before the sequence of bits corresponding to the pattern to be detected, as shown in FIG. 4, is applied to the shift register. Comparing the contents of the shift register 20 and the contents of the memory register 30 at time $t_0$: we add a "1" because the "0" in the first stage of the shift register corresponds to its associated bit in the memory register; a "1" is subtracted because the second stage bits do not correspond; the third stage bits correspond, so a "1" is added; the non-correspondence of the fifth stage bits causes a "1" to be subtracted; and the eighth stage bits do not correspond so, according to the eighth stage rule, nothing is done. The net result of the five comparisons is "0," so a "0" is added to the counter, as shown in column I. The count in column II is determined not only by the number currently added to the counter, but is also a function of the numbers accumulated during previous time intervals. In this case, a count of three has been accumulated (as will be explained later) during the time prior to $t_0$. Note that there are three "0's" in the predetermined pattern, and the number in column II shows that the three "0's" in the predetermined pattern correspond to three of the "0's" in the all "0" pattern present in the shift register at time $t_0$. At time $t_1$, a "1" which corresponds to the first bit of the desired pattern, is entered into the first stage of the shift register. The other bits are shifted one stage to the right, the "0" in the eighth stage being discarded. At time $t_1$, a "0" is added to the counter as a result of the first stage comparison, a "−1," "+1" and "−1" are added as a result of the second, third and fifth stage comparisons, respectively, and a " 0" is added for the eighth stage comparison. The five comparisons during time $t_1$ have a net result of "−1" which is added to the counter (column I), thereby reducing the number in the counter to two (column II). As the pattern is shifted through the shift register during times $t_2$ through $t_6$, and similar comparisons are made, the number in column II fluctuates but remains relatively small. At time $t_7$, the desired predetermined pattern is fully loaded in the shift register. The comparisons during time $t_7$ result in a "+4" being added to the number in the counter, raising the number in the counter to seven, indicating a complete 7-bit correspondence between the received pattern and the predetermined pattern. At time $t_8$, information other than the predetermined pattern enters the shift register, and the number accumulated in the counter is reduced to four, indicating that the desired pattern has passed.

Since the number accumulated in the counter is a function of both previous and current information, a way must be provided to preset the counter when the circuit is energized. This can be accomplished several ways, including, loading the desired predetermined pattern into the first seven stages of the shift register and setting the count in the counter to seven, loading the inverse of the predetermined desired pattern into the first seven stages of the shift register and setting the counter to zro, loading all "0's" into the shift register, as was done in the previous example, and setting the number in the counter equal to the number of "0's" in the pattern, or loading a pattern consisting of all "1's" into the shift register and setting the counter to a number equal to the number of "1's" in the desired pattern. After this has been done, the system will provide a correct count for all patterns, regardless of noise on the received pattern, because any error in the shift register resulting from noise on the received pattern will be cleared after the error has passed through the first seven stages of the shift register.

Figure 6:
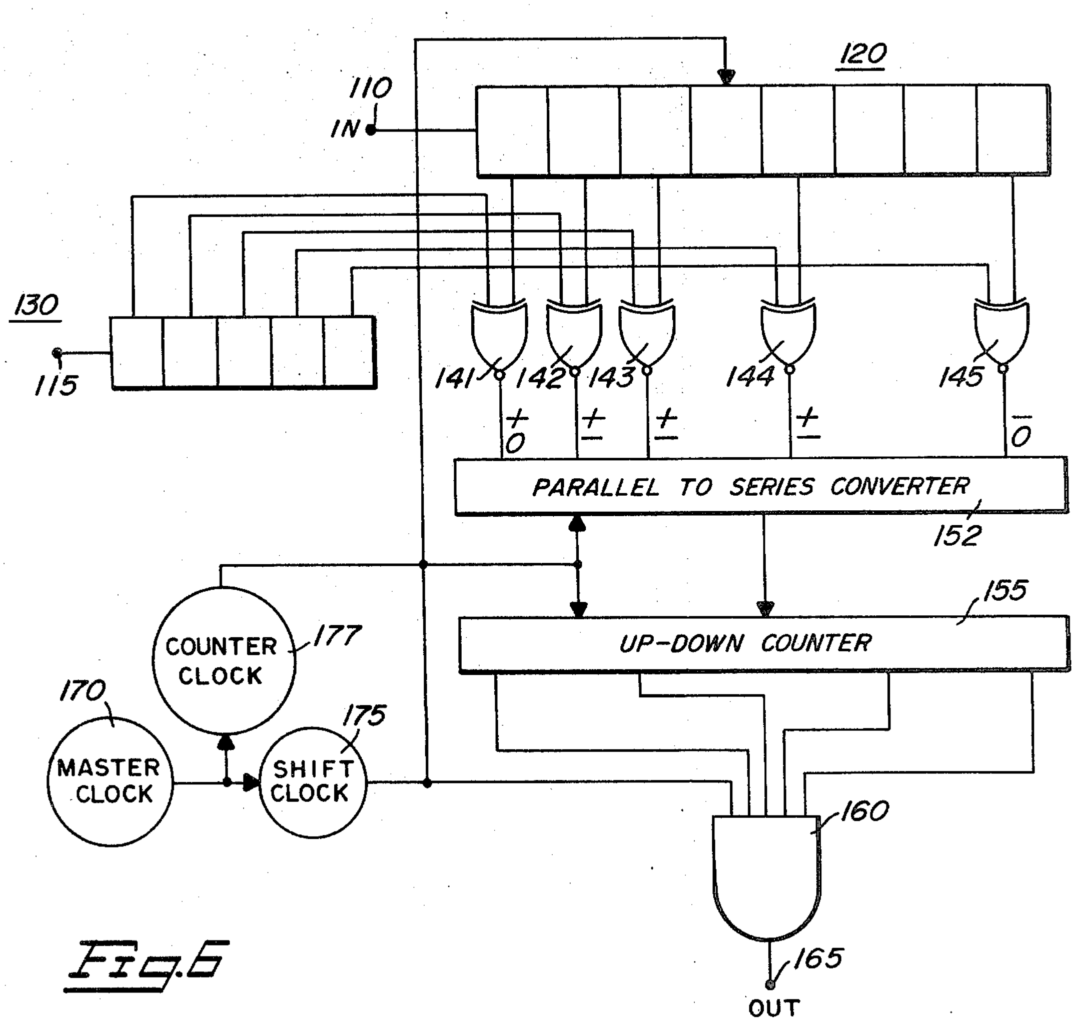
FIG. 6 is a block diagram of another embodiment of the digital pattern recognition system according to the invention.

Referring to FIG. 6, there is shown in block diagram form, another embodiment of a pattern recognition system according to the invention. Several components in this embodiment are similar to the components of the embodiment of FIG. 1, similar components having like numbers with a 100 prefix added. Two registers are used, including a shift register 120 and a memory register 130, providing similar functions to registers 20 and 30, respectively, of FIG. 1. Gates 141 through 145 are connected to registers 120 and 130, and compare the pattern stored in register 130 with the sequence passing through register 120. The outputs of gates 141 through 145 are connected to a parallel to series converter 152 which is in turn connected to an up-down counter 155. Up-down counter 155 is connected to a gate 160, which provides an output at output point 165 when the value of the count in up-down counter 155 reaches a predetermined value. A master clock 170 provides timing signals for the circuit, and is connected to a shift clock 175 and a counter clock 177. Shift clock 175 is connected to register 120 to enable register 120 to accept and shift information applied to input point 110. Shift clock 175 is also connected to gate 160 and provides pulses to enable gate 160 to provide an output signal at output point 165 when the value of the count in counter 155 reaches a predetermined value. Counter clock 177 is connected to the parallel to series converter 152 and to up-down counter 155. Counter clock 177 provides pulses that have a repetition rate which is a multiple of the repetition rate of the pulses from master clock 170. The pulses from counter clock 177 enable parallel to series converter 152 to serially sample each of the output signals from gates 141 through 145, and to sequentially apply these signals to up-down counter 155 during the time interval between shifts of shift counter 120.

The techniques of the present invention provide an efficient way to accurately detect the presence of a predetermined pattern, or sequence of digital signals. The circuits according to the invention are relatively simple, eliminating the need for comparing each bit of the incoming signal with a corresponding bit stored in a memory means and recounting the number of correspondences after every shift. The system provides accurate detection of the pattern, and when used in conjunction with cyclic codes, provides for accurate detection of a pattern with a minimum number of errors.

Although specific embodiments of the invention have been disclosed in the foregoing, it should be noted that any system that provides digital pattern recognition using the techniques of sampling only predetermined bits of the pattern, described herein, still falls within the scope of the invention.

I claim:

1. The method of recognizing a predetermined pattern in a digital signal, said pattern having a predetermined number of bits, comprising the steps of; serially applying the digital signal to a sample and storage means having a number of stages greater by one than said predetermined number of bits comprising said pattern, shifting said digital signal through said sample and storage means, a shift occurring each time a bit is applied to said sample and storage means, sampling between shifts the contents of only the first, last and predetermined intermediate stages of said sample and storage means, said intermediate stages corresponding to bits of said predetermined pattern adjacent a transition therein upon said pattern being loaded into said sample and storage means, comparing the contents of each of said sampled stages with a predetermined bit of a second digital pattern derived from said predetermined pattern, and providing one of a first sense and a null signal in response to said first stage comparison, one of first and second sense signals in response to each intermediate stage comparison, and one of a second sense and null signal in response to said last stage comparison to provide a comparison signal in accordance with said comparisons, supplying said comparison signal to counting means, and providing a pattern recognition signal when the counting means reaches a predetermined count.

2. The method as recited in claim 1, wherein sampling the contents of said predetermined intermediate stages of said sample and storage means includes the steps of; determining the stage of said sample and storage means that corresponds to each bit of said predetermined pattern upon said pattern being completely loaded into said sample and storage means, the bits of said pattern filling all stages prior to the last stage thereof, and connecting comparison means to the stages of said sample and storage means that correspond to the bits of said predetermined pattern that immediately precede a transition therein.

3. The method as recited in claim 1, wherein said comparison signal is provided by the steps of:

comparing the contents of said first stage of said sample and storage means with a predetermined one of said bits of said second digital pattern, providing a first sense signal when the contents of said first stage has a first predetermined relationship to said compared bit of said second pattern, and providing a null signal when the contents of said first stage has a second predetermined relationship to said compared bit of said second pattern;

comparing the contents of each of said predetermined intermediate stages of said sample and storage means each with a predetermined one of the bits of said second digital pattern, each comparison providing a first sense signal when the contents of said associated intermediate stage has one of said first and second predetermined relationships to said compared bit, and providing a second sense signal when the contents of said associated intermediate stage has the other of said first and second predetermined relationships to said compared bit;

comparing the contents of said last stage of said sample and storage means with a predetermined bit of said second digital pattern, providing a null signal when the contents of said last stage has one of said first and second predetermined relationships to said compared bit, and providing a second sense signal when the contents of said last stage has the other of said first and second predetermined relationships to said compared bit, wherein said first sense signals, said second sense signals and said null signals determine said comparison signal.

4. The method as recited in claim 1, wherein said comparison signal is provided by the steps of:

comparing the contents of said first stage of said sample and storage means with a predetermined one of said bits of said digital pattern, and adding a unit when said contents and said bit are similar;

comparing the contents of each of said predetermined intermediate stages of said sample and storage means each with a predetermined one of the bits of said second digital pattern, adding a unit for each comparison wherein said contents and said predetermined bit are similar, and subtracting a unit for each comparison wherein said contents and said predetermined bit are dissimilar; and comparing the contents of said last stage of said sample and storage means with a predetermined bit of said second digital pattern, subtracting a unit when said contents and said bit are similar, wherein said comparison signal is related to the aggregate of said units.

5. The method as recited in claim 1 wherein the second digital pattern is provided by the steps of:

determining the bits contained in each of the first and sampled intermediate stages of said sample and storage means upon said predetermined pattern being completely loaded into said sample and storage means, the bits of said pattern filling all stages prior to the last stage thereof, and loading bits corresponding to said bits into a memory means; and providing a bit related to said entire predetermined pattern for negating any contribution to said count previously provided by the bit stored in the last stage of said sample and storage means, and loading a bit corresponding to said negating bit into said memory means, said loaded bits comprising said second digital pattern.

6. A system for detecting a predetermined pattern in a digital signal, said pattern having a predetermined number of bits, said system including in combination; sample and storage means having an input for serially receiving said digital signal and a plurality of stages for storing digital signals, the number of stages being greater by one than said predetermined number of bits comprising said predetermined pattern, memory means for storing a second digital pattern related to said predetermined pattern, comparison means connected to only the first, last and predetermined intermediate stages of said sample and storage means that correspond to bits of said predetermined pattern adjacent a transition therein upon said predetermined pattern being loaded into said sample and storage means, and to said memory means, said comparison means comparing the bits stored in the first, last and predetermined intermediate stages of said sample and storage means with the second digital pattern stored in said memory means, counting means connected to said comparison means and receiving digital signals therefrom in accordance with the relationship between the bits stored in said stages and the second digital pattern stored in said memory means, said counting means including means for providing a signal indicative of said relationship when the count in said counting means reaches a predetermined value, and clock means coupled to one of said sample and storage means, said comparison means and said counting means for controlling the operation thereof.

7. A system as recited in claim 6 wherein said comparison means is connected to the intermediate stages of said sample and storage means that correspond to bits of said predetermined pattern that immediately precede a transition therein upon said predetermined pattern being loaded into said sample and storage means and filling all stages prior to the last stage thereof.

8. A system as recited in claim 7 wherein said comparison means and said counting means include means for raising the value of the count in said counting means when the bit stored in said first stage of said sample and storage means has a first of a first and second predetermined relationship to one bit of said second digital pattern, means for raising the value of the count in said counting means for each bit stored in said predetermined intermediate stages having one of said first and second predetermined relationships to an associated bit in said second digital pattern, and for lowering the count for each bit stored in said predetermined intermediate stages having the other of said first and second relationships to an associated bit, and means for lowering the value of the count in said counting means when the bit stored in the last stage of said sample and storage means has one of said first and second predetermined relationships to one bit in said second digital pattern.

9. A system as recited in claim 8 wherein said counting means further include means for adding one to the count in said counting means when the bit stored in said first stage of said sample and storage means is similar to a predetermined bit stored in said memory means, means for adding one to the count for each bit stored in said predetermined intermediate stages that is similar to an associated bit stored in said memory means, and for substracting one for each bit that is dissimilar to an associated bit stored in said memory means, and means for subtracting one from the count when the bit stored in the last stage of said sample and storage means is similar to a compared bit stored in said memory means.

10. A system as recited in claim 8 further including means for entering bits into said memory means, each of said bits prior to a last bit being individually related to one of the first and intermediate bits of said predetermined pattern that immediately precede a transition in said pattern, the last bit entered into said memory means being related to the entire predetermined pattern for causing said comparison means to negate any contributions to the count in said counting means previously provided by the bit stored in the last stage of said sample and storage means.

11. A system as recited in claim 6 wherein said sample and storage means includes a shift register.

12. A system as recited in claim 6 wherein said memory means is a storage register having a plurality of stages.

13. A system as recited in claim 6 wherein said comparison means includes a plurality of gate means, each of said gate means being connected to one stage of said sample and storage means and to said memory means.

14. A system as recited in claim 6 wherein said counting means includes means for limiting the value of the count therein to the range including zero to the number of bits comprising said predetermined pattern.

15. A system as recited in claim 14 wherein said counting means includes an up-down counter.

16. A system as recited in claim 15 further including means for providing a pattern recognition signal when the count in said counting means reaches a predetermined value.

17. A system as recited in claim 6 wherein said clock means includes means for causing said sample and storage means to sample said digital signal and to shift bits previously stored therein between stages thereof, and further includes means for causing said counting means to count said comparison signals during the time interval between shifts.

* * * * *